United States Patent
Maximus et al.

(12)

(10) Patent No.: US 6,224,215 B1
(45) Date of Patent: May 1, 2001

(54) CONTRAST IMPROVEMENT IN LIQUID CRYSTAL LIGHT VALVE PROJECTORS

(75) Inventors: Bart Maximus, Oudenaarde; Patrick Candry, Harelbeke; Bart Van Den Bossche, Kuurne, all of (BE)

(73) Assignee: Barco N.V., Poperinge (BE)

( * ) Notice: Subject to any disclaimer, the term of this patent is extended or adjusted under 35 U.S.C. 154(b) by 0 days.

(21) Appl. No.: 09/438,381

(22) Filed: Nov. 12, 1999

Related U.S. Application Data

(63) Continuation of application No. PCT/BE98/00073, filed on May 20, 1998.

(30) Foreign Application Priority Data

May 20, 1997 (EP) .................................. 97870070

(51) Int. Cl.[7] .................................................. G03B 21/14
(52) U.S. Cl. .................................. 353/20; 349/5; 353/69; 353/70
(58) Field of Search ..................... 353/69, 70, 20, 353/79, 31, 34, 37; 349/5, 7, 8, 9

(56) References Cited

U.S. PATENT DOCUMENTS

| | | | |
|---|---|---|---|
| 5,220,363 | * 6/1993 | Sato et al. | 353/70 |
| 5,355,188 | * 10/1994 | Biles et al. | 353/69 |
| 5,371,559 | 12/1994 | San-Nohe et al. | |
| 5,375,006 | 12/1994 | Haas | 359/73 |
| 5,422,691 | * 6/1995 | Nimomiya et al. | 353/69 |
| 5,442,413 | * 8/1995 | Tejima et al. | 353/70 |
| 5,576,854 | 11/1996 | Schmidt et al. | 359/40 |
| 5,703,663 | * 12/1997 | Fujioka et al. | 353/70 |
| 5,820,240 | * 10/1998 | Ohzawa | 353/70 |
| 5,836,664 | * 11/1998 | Conner et al. | 353/70 |

OTHER PUBLICATIONS

Patent Abstracts of Japan, vol. 096, No. 001, Jan. 31, 1996 & JP 07 234401 A (Fujitsu Ltd.) Sep. 5, 1995.
Patent Abstracts of Japan, vol. 015, No. 234 (P–1215), Jun. 14, 1991 & JP 03 07110 A (Sanyo Electric Co., Ltd.) Mar. 26, 1991 & EP 0 409 426 A (Sanyo) Jan. 23, 1991.

* cited by examiner

*Primary Examiner*—William Dowling
(74) *Attorney, Agent, or Firm*—Pillsbury Winthrop LLP

(57) ABSTRACT

The present invention relates to a light valve image projector with a disposition for improving the contrast of an optical image projected on a screen by that projector. The projector comprises at least one illumination system, at least one field lens, at least one set consisting of a polarizer, an LCD and an analyzer and at least a projection lens, and presents at least one optical axis which includes an angle $\alpha$ with the optical axis of the projection lenses. The invention consists in positioning the analyzer so that it includes an angle larger than $\alpha$ with the LCD, at least for the light rays that pass through the contrast limited area of the LCD. The invention consists furthermore in placing the polarizer so that it includes an angle larger than $\alpha$ with the LCD. Both the analyzer and/or the polarizer may have a flat or a curved surface.

9 Claims, 4 Drawing Sheets

CONTRAST IMPROVEMENT IN LIQUID CRYSTAL LIGHT VALVE PROJECTORS

This is a Continuation International Appln. No. PCT/BE98/00073 filed May 20, 1998.

FIELD OF THE INVENTION

The present invention relates to contrast improvement in liquid crystal light valve projection systems, more particularly to a light valve image projector with a disposition for improving the contrast of the by that projector projected optical image.

BACKGROUND OF THE INVENTION

For an enlarged projection of images on a screen by means of a light valve projector, an optical image is put on a light valve and bundled light is sent through said light valve. Said light then passes through an appropriate projection lens system, which focuses an image on the screen. An appropriate light valve for such a projection system is a liquid crystal display, commonly referred to as an "LCD".

Two kinds of liquid crystal light valve projectors exist: OFF-axis projectors and ON-axis projectors.

FIG. 1 shows the optical path in an OFF-axis projection system. Said projection system comprises an OFF-axis projector 1 and a screen 2. The OFF-axis projector 1 comprises an illumination system 3, a field lens 4, a polariser 5, an LCD 6, an analyser 7 and a projection lens 8. The illumination system 3 comprises a lamp, a reflector, and an integrating system which converts the circular and non-uniform light distribution coming from the reflector into a rectangular and uniform illumination of the LCD 6. The field lens 4 images the illumination system into the entrance pupil of the projection lens 8. In this way, it ensures that the light with which the LCD 6 is illuminated is directed into this entrance pupil of the projection lens 8. The projection lens 8 images the illuminated LCD 6 on the screen 2. The line through the optical centres of the illumination system 3, the field lens 4 and the projection lens 8 is further called the optical axis 9 of the projector 1.

In case the OFF-axis projector 1 is a multi-light valve projector (for example a projector with three light valves), the optical path is more complex, because by means of a set of dichroic mirrors the light is splitted into 3 colours (red, green and blue), and after modulation of the light, these colours are recombined again. The OFF-axis projector then comprises an illumination system, three field lenses, three sets consisting of a polariser, an LCD and an analyser, and a projection lens. A line through the optical centres of the illumination system, one of the field lenses and the projection lens is an optical axis of the projector. The schematic description of the illumination and imaging system shown in FIG. 1 is not altered by these colour-splitting mirrors. In what follows the state of the art is described as if there were only one illumination system, one field lens, one set consisting of a polariser, an LCD and an analyser, and one projection lens.

The direction of the optical axis 9 of the projector 1 is different from the direction of the optical axis 10 of the projection lens 8. Both optical axes 9 and 10 include an OFF-axis angle α as shown in FIG. 1. This angle α can have any positive value, but in the most common OFF-axis configuration, the projector 1 is set up in such a way that the optical axis 10 of the projection lens 8 intersects with the bottom of the image of the screen 2.

If the OFF-axis angle α is zero, or in other words, if the direction of the optical axis 9 of the projector 1 is equal to the direction of optical axis 10 of the projection lens 8, the projector is called an ON-axis projector. FIG. 10a shows the minimum configuration of an ON-axis liquid crystal light valve projection system. It comprises an ON-axis projector 11 and a screen 2. The ON-axis projector 11 comprises the same parts as the OFF-axis projector 1 described hereinabove. Said same parts have been denoted by means of the same reference numerals.

FIG. 2 shows an image source of as well OFF-axis and ON-axis liquid crystal light valve projectors 1 and 11. Said image source comprises a polariser 5, an LCD 6 and an analyser 7. Although represented in FIG. 2 as three separate parts, two of the parts or the three parts can form one unit. The polariser 5 and the analyser 7 are both light polarising elements and have in their planes each an absorbing direction and a non-absorbing direction, the absorbing direction being perpendicular to the non-absorbing direction.

The LCD 6 comprises, with reference to the light direction, a front glass plate 15, a back glass plate 16 and sealed in between both glass plates 15, 16 a twisted nematic liquid crystal layer. The sides of the glass plates 15 and 16 not touching the twisted nematic liquid crystal layer, each have a layer with transparent image forming pixel electrodes. The twisted nematic LCD (TN-LCD) may be addressed with an active matrix. In such an active matrix TN-LCD, a switching device, such as a thin film transistor or a number of thin film diodes, is integrated on each pixel.

In FIG. 2, the non-absorbing direction 17 of the polariser 5 is perpendicular to the rubbing direction 18 of the front glass plate 15 of the LCD 6. Said rubbing direction 18 defines the preferred direction of the liquid crystal molecules at the interface with the front glass plate 15. The non-absorbing direction 19 of the analyser 7 is perpendicular to the rubbing direction 20 of the back glass plate 16. In a twisted nematic liquid crystal display, the rubbing directions at the opposite glass plates are perpendicular, and therefore the molecules form a 90 degrees twisted helix in the bulk as shown in FIG. 3a and FIG. 3b. FIG. 3a shows the distribution of the molecules 21 in a twisted nematic LCD between the front glass plate 15 and the rear glass plate 16 in the bright state. FIG. 3b shows the corresponding distribution in the dark state.

To obtain an optimum black level in an image projected by a projection system containing a polariser, an LCD and an analyser, the non-absorbing directions of these three elements must be correctly matched. Therefor, the analyser or the polariser may be installed rotatable around their normal.

The contrast of the image obtained with an LCD as light valve depends strongly on the angle of incidence of the light entering the LCD. It is by consequence LCD area and, by consequence, screen area dependent, what is explained by the following.

FIG. 4 shows the typical viewing angle characteristics of a twisted nematic LCD. The graphs are lines of equal contrast between the bright and dark state at the two corresponding driving voltages, with relative values between 3 and 300. The vertical axis shows the vertical angle of incidence between −40° and 40°. It presents the component of the light ray within the plane perpendicular to both the plane of the LCD and the horizontal image scanning direction of the LCD. The horizontal axis gives angles of incidence between −40° and 40° and is the component of the light ray within the plane perpendicular to the plane of the LCD and the vertical image scanning direction of the LCD.

FIG. 4 thus demonstrates the dependence of the contrast in function of the incident angle of the light which enters the LCD. The contrast changes much more in the vertical direction than in the horizontal direction of the screen. Moreover, the maximum contrast is not obtained for light rays with normal incidence but for light rays having a small incident angle in the vertical direction. This angle corresponds with the angle $\alpha_v$ shown on FIG. 3b. The angle $\alpha_v$ corresponds very well with the remaining tilt at dark state of the molecules in the twisted nematic liquid crystal layer.

FIG. 1 and FIG. 10a show that light rays enter the LCD under different angles. As a consequence of the phenomena shown in FIG. 4, without further measures being taken, an image projected by a projector using as light valve a twisted nematic LCD, will be non-uniform, which is differently contrasted in vertical direction.

FIG. 5 shows in another way how the LCD light transmission (vertical axis) depends on the angle of incidence (different graphs) and on the LCD drive voltage (horizontal axis). For angles of light incidence larger than 0°, the light transmission graphs show a minimum. This minimum determines the maximum obtainable contrast at that angle of incidence, as for higher drive voltages the contrast is negative. For larger positive angles of incidence, the minimum transmission value is higher and so the maximum obtainable contrast is lower. For smaller positive angles of incidence, the location of the minimum on the graph is shifted to a higher drive voltage and to a lower transmission value or higher obtainable contrast. For zero and negative angles of incidence of light, there is no minimum of transmission.

Another representation of the contrast dependence of the angle of incidence, also including the behaviour of the LCD in function of its drive voltage, is given by the graphs "0" in figures FIGS. 6a, 6b and 6c. The normalised intensity on the screen is displayed on these figures in function of the LCD drive voltage for a projection system as illustrated by FIG. 1. FIG. 6a shows the intensity measured at the top of the display screen; FIG. 6b shows the intensity in the middle of the screen; FIG. 6c shows the intensity measured at the bottom of the screen.

FIG. 6a shows that in areas of the image where the angle of incidence of light is larger, the intensity of the projected image has a minimum value for a specific drive voltage of the LCD. This is the case at the top of the image in a projection system as illustrated in FIG. 1. For drive voltages above the voltage of minimum intensity, the contrast is even negative. If otherwise the drive voltage should be equal all over the LCD, such an intensity minimum will appear on the screen at a specific angle of incidence and be visible as horizontal darker bar.

FIG. 6b and FIG. 6c show that in areas of the image where the angle of incidence is smaller, such a minimum of intensity (or in other words maximum of contrast) does not occur. There, the limitation is determined by the maximum LCD drive voltage allowed.

For the above reasons, in practice the LCD drive voltages are chosen so as to get a uniform black level or minimum intensity all over the screen. The limit is thereby determined by what can be obtained in the area of larger angles of incidence, and so does not result in the best contrast possible in other areas of the screen.

In order to obtain a better contrast and better uniformity of contrast without loss of other picture quality, various methods of contrast enhancement and apparatus with improved contrast are known.

Various apparatus have additional physical items with reference to the minimum projector set-up as described in FIG. 1.

In U.S. Pat. No. 5,576,854, a quarter-wave compensator plate is disposed between the polariser and the liquid crystal light. This solution is only suitable for the reflective set-up described in the patent and is not applicable for projection with TN-LCDs.

In U.S. Pat. No. 5,371,559, a stop is disposed inside the projection lens, forming an aperture of the lens assembly decentered from the optical axis of the lenses of the projection lens assembly in the vertical scanning direction of the liquid crystal panel. The blocking of the light rays at the entrance pupil of the lens reduces the efficiency of the projection system, resulting in a lower light output of the projector.

In U.S. Pat. No. 5,375,006, contrast improvement in a projector using TN-LCDs is obtained by using (uniaxial) birefringent films. In some of the claims, the films are even inclined with respect to the optical axis. This solution however complicates the complete stack of elements of the LCD light-modulating device, because two new optical surfaces are introduced. This leads to light loss due to extra reflections. If the films are optically coupled to minimise this light loss, then the LCD itself becomes thicker, and more difficult to cool. Moreover, these thin birefringent films are also sensitive to temperature changes and mechanical stress caused by the temperature differences in a high light-output projector.

SUMMARY OF THE INVENTION

It is an object of the present invention to overcome the problems mentioned hereinabove.

According to the present invention, a light valve image projector provided with a disposition for improving the contrast of a by that projector projected optical image is provided. The projector comprises at least one illumination system, at least one field lens, at least one set consisting of a polariser, an LCD and an analyser, and at least one projection lens. It presents at least one optical axis, each optical axis of the projector including an angle $\alpha$ with the optical axis of the projection lenses. At least one of the analysers includes with the LCD of the same set, consisting of polariser, LCD and analyser, an angle $\beta_a$ larger than the angle $\alpha$, at least for the light rays that pass through the contrast limiting area of said LCD. The angle $\beta_a$ is so that said at least one of the analysers is not parallel to the polariser belonging to the same set consisting of analyser, LCD and polariser, at least for the light rays that pass through the contrast limiting area of the LCD. The contrast limiting area of an LCD included in a light valve image projector is defined as the part of the surface of the LCD through which light rays pass at that angle with the LCD for which the highest obtainable contrast is minimum.

The projector may be a monochrome projector or a multicolour projector. In case there are more sets consisting of a polariser, an LCD and an analyser, the angles $\beta_a$ included by each analyser with the corresponding LCD of the same set, may be different.

According to a preferred embodiment, also at least one of the polarisers includes an angle $\beta_p$ with the LCD of the same set consisting of polariser, LCD and analyser. This angle is larger than the angle $\alpha$, at least for the light rays that pass through the contrast limiting area of said LCD. In case there are multiple sets consisting of a polariser, an LCD and an analyser, the angles $\beta_p$ included by each polariser with the corresponding LCD of the same set, may be different.

If the angle $\alpha$ mentioned hereinabove is different from zero, the projector is called an OFF-axis projector.

If the angle α is equal to zero, the projector is called an ON-axis projector.

According to one embodiment of the present invention, at least one of the analysers of the projector has a flat surface.

According to another embodiment, at least one of the analysers is curved. In that case it has a curvature such that the tangent planes of said analyser at the points of incidence of the light rays which pass through the contrast limiting area of the LCD of the same set, include an angle $\beta_a > \alpha$ with the plane of the LCD.

According to a further embodiment, at least one of the polarisers has a flat surface.

According to yet another embodiment, at least one of the polarisers is curved. In that case it has a curvature such that the tangent planes of said polariser at the points of incidence of the light rays passing through the contrast limiting area of the LCD of the same set, include an angle $\beta_p > \alpha$ with the plane of the LCD.

Analyser (s) and polariser(s) may be movable such that the angles $\beta_a$ and/or $\beta_p$ can be adjusted by the manufacturer and/or by the user.

A specific embodiment of the present invention is a projector comprising one illumination system, three field lenses, three sets consisting of a polariser, an LCD and an analyser, and one projection lens.

BRIEF DESCRIPTION OF THE DRAWINGS

The invention will be better understood by means of the following drawings, in which.

DETAILED DESCRIPTION OF THE INVENTION

Figure 8A:
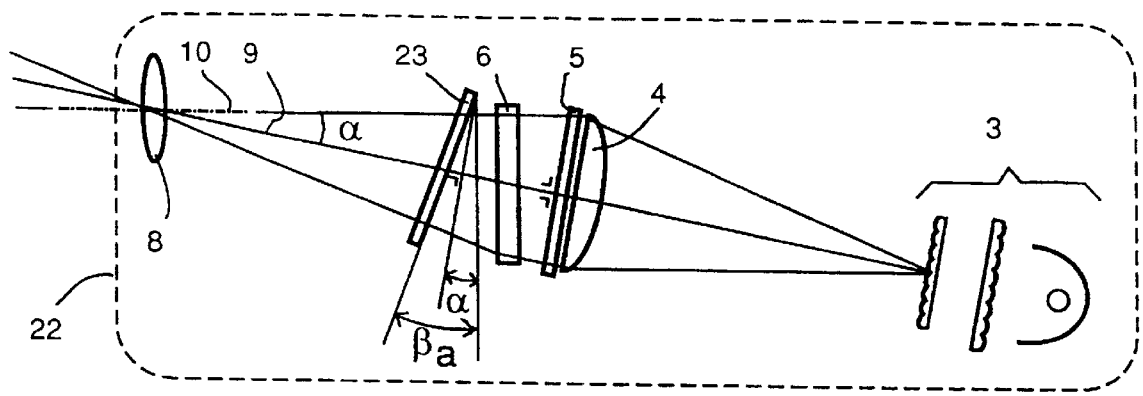
FIG. 8a shows an OFF-axis projection system wherein the angle between the analyser and the LCD is larger than the OFF-axis angle.

A first embodiment of the present invention is shown in FIG. 8a. It presents an OFF-axis projector 22, wherein the angle $\beta_a$ between the analyser 23 and the LCD 6 is made larger than the OFF-axis angle α. The polariser 5 is perpendicular to the optical axis of the projector 9 and includes an angle to the LCD 6, which is equal to the OFF-axis angle α.

Figure 6A:
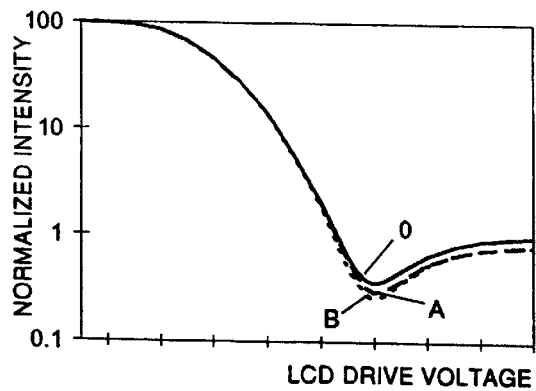
FIG. 6a, FIG. 6b and FIG. 6c show the normalised intensity of an image projected by an OFF-axis projector in function of the drive voltage applied to the LCD, respectively at the top, in the middle and at the bottom of the screen.
Figure 6B:
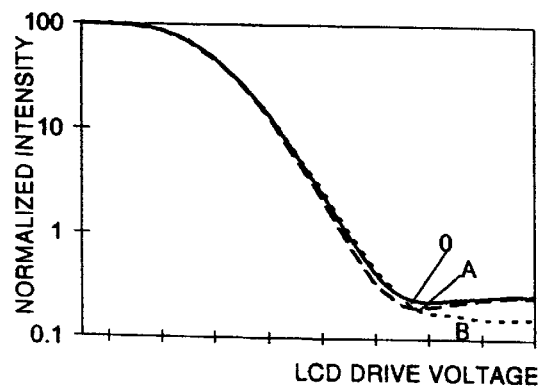
Figure 6C:
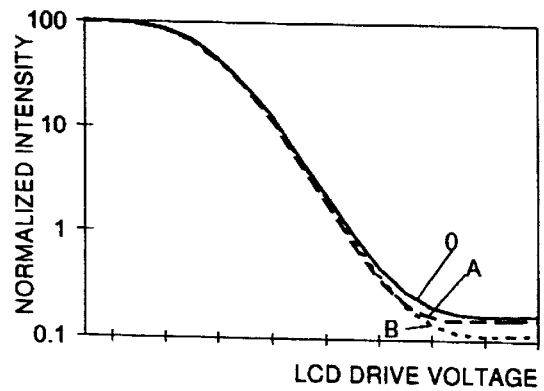

FIG. 6a, FIG. 6b and FIG. 6c show the normalised intensity of an image projected by the OFF-axis projector, in function of the drive voltage applied to the LCD, at the top, in the middle and at the bottom of the screen respectively. The graphs marked "0" correspond to the prior art OFF-axis projection system, whereby the polariser and the analyser are mounted perpendicular to the optical axis of the projector, or in other words have an angle to the LCD surface equal to the OFF-axis angle α. The graph marked "A" corresponds to the set-up covered by this invention and described in this first embodiment, whereby the angle $\beta_a$ between the analyser and the LCD is larger than the OFF-axis angle α.

In this first embodiment of the present invention, the contrast is improved over the whole screen, as illustrated in the three drawings FIG. 6a, FIG. 6b and FIG. 6c, wherein the graphs "A" show lower values of intensity compared to the graphs "0". The result is that in the area which determines the minimum of contrast being the top of the screen, the contrast is increased compared to the prior art version. The contrast in the other areas being the middle and the top of the screen is also improved in a way that the overall contrast compromise is improved compared to the prior art version.

Figure 8B:
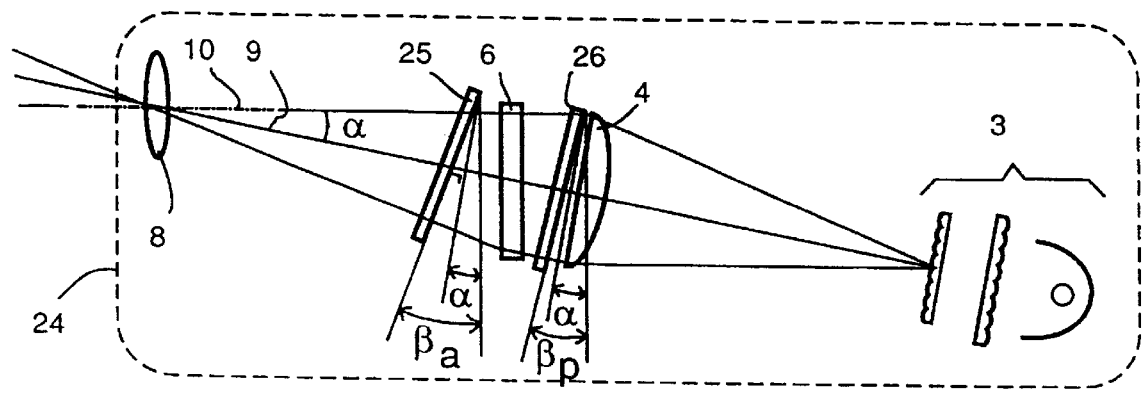
FIG. 8b shows an OFF-axis projector wherein the angle between the analyser and the LCD and the angle between the polariser and the LCD are larger than the OFF-axis angle.

A second embodiment of the present invention is shown in FIG. 8b. It presents an OFF-axis projector 24 wherein the angle $\beta_a$ between the analyser 25 and the LCD 6 is made larger than the OFF-axis angle α. The angle $\beta_p$ between the polariser 26 and the LCD 6 is larger than the OFF-axis angle α.

The graphs "B" in FIG. 6a, FIG. 6b and FIG. 6c show the improvement of the contrast of the image obtained by means of the decrease of the lower intensity levels in function of the LCD drive voltage, compared to the lower intensity levels for the prior art OFF-axis projection system (graphs "0") and to the intensity for the first embodiment OFF-axis projector (graphs "A"). Compared to the first embodiment, the second embodiment has a decreased, or in other words improved, black level at the top, in the middle and at the bottom of the screen. Having the polariser mounted including an angle to the LCD which is larger than the OFF-axis angle α improves even more the over all black level of the projector and permits to obtain the highest possible contrast all over the screen.

Figure 10A:
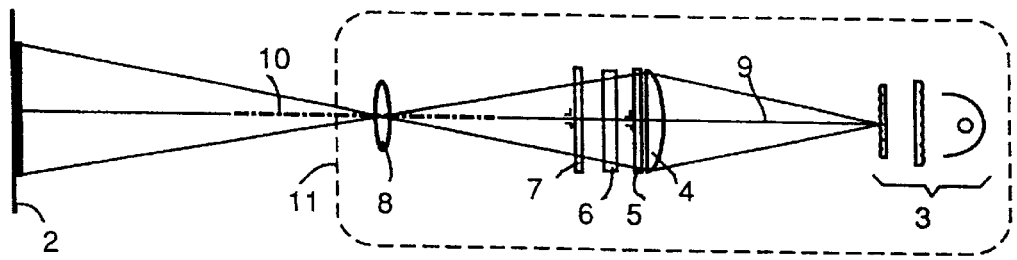
FIG. 10a shows the optical path in an ON-axis projection system (prior art)
Figure 10B:
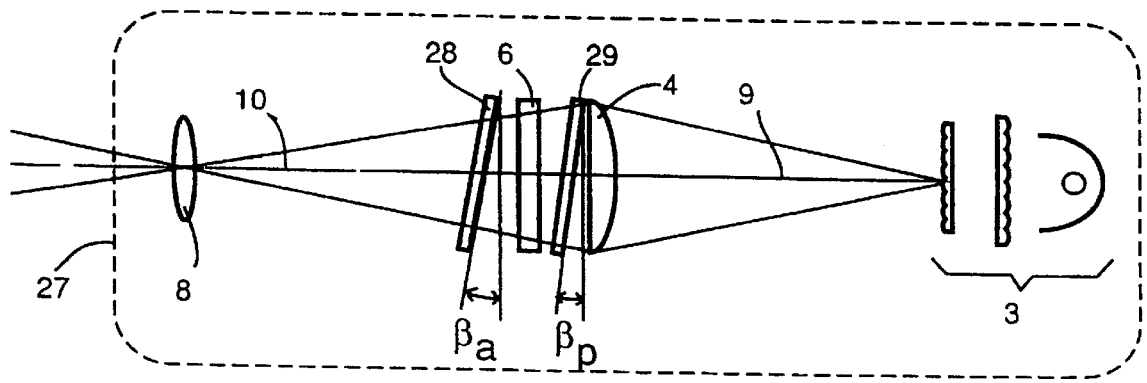
FIG. 10b shows an ON-axis projector wherein the angle between the analyser and the LCD and the angle between the polariser and the LCD are larger than 0•.

Another embodiment of the present invention is shown in FIG. 10b. In an ON-axis projector 27 the angle $\beta_a$ between the analyser 28 and the LCD 6 as well as the angle $\beta_p$ between the polariser 29 and the LCD 6 are made larger than 0 degrees.

Figure 7A:
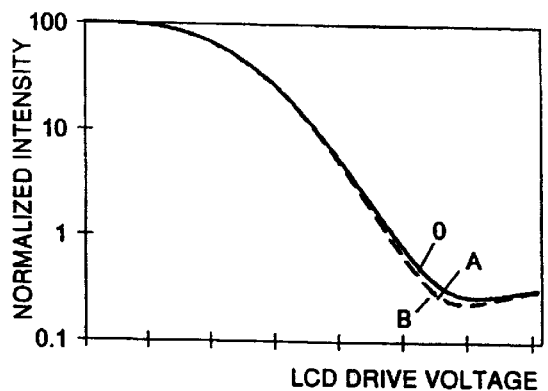
FIG. 7a, FIG. 7b and FIG. 7c show the normalised intensity of an image projected by an ON-axis projector in function of the drive voltage applied to the LCD, respectively at the top, in the middle and at the bottom of the screen.
Figure 7B:
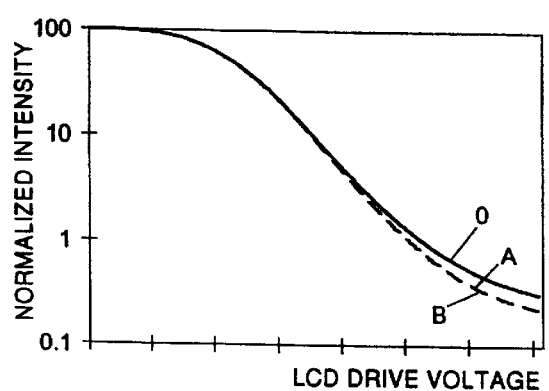
Figure 7C:
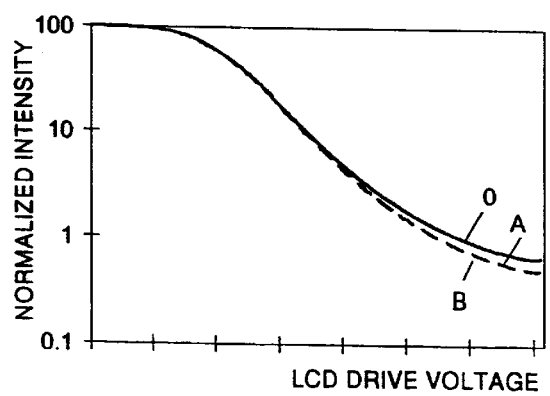

FIG. 7a, FIG. 7b and FIG. 7c show the normalised intensity of an image projected by the ON-axis liquid crystal light valve projector in function of the drive voltage applied to the LCD, at the top, in the middle and at the bottom of the screen respectively. The graph marked "0" corresponds to the prior art projection system whereby the polariser and the analyser are mounted perpendicular to the optical axis of the projector, or in other words are parallel to the LCD. The graph marked "A" corresponds to the ON-AXIS projection system whereby the angle $\beta_a$ between the analyser and the LCD is different from zero, and whereby the angle $\beta_p$ between the polariser and the LCD is equal to zero. The graph marked "B" corresponds to the ON-AXIS projection system whereby both the angles $\beta_a$ and $\beta_p$ are different from zero.

Figure 1:
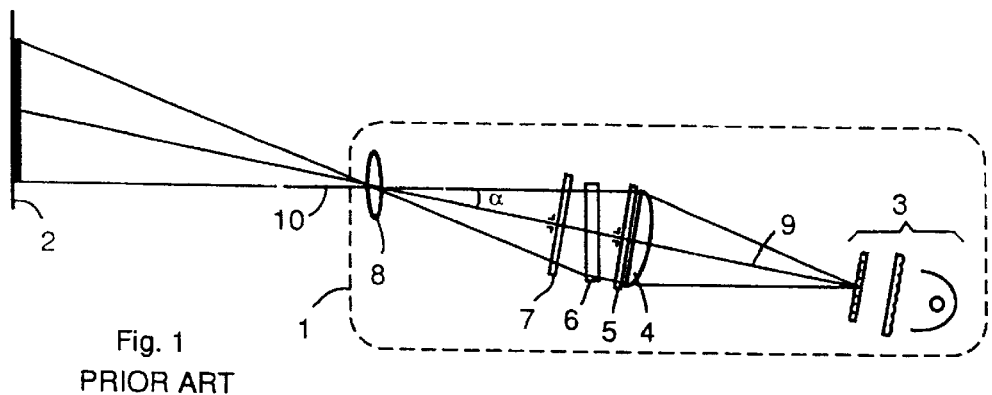
FIG. 1 shows the optical path in an OFF-axis projection system (prior art)
Figure 2:
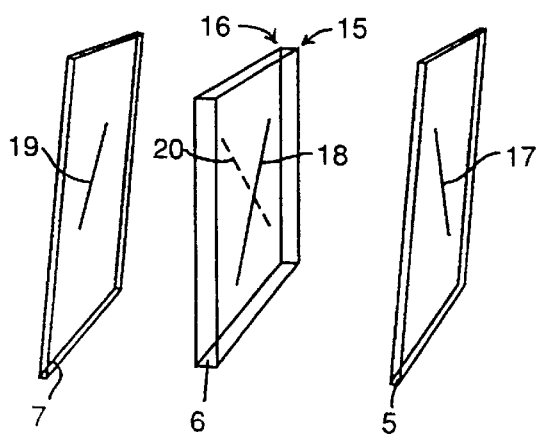
FIG. 2 shows the non-absorbing directions of the polariser and the analyser as they are mounted in a conventional way in a liquid crystal light valve projector (prior art)
Figure 3A:
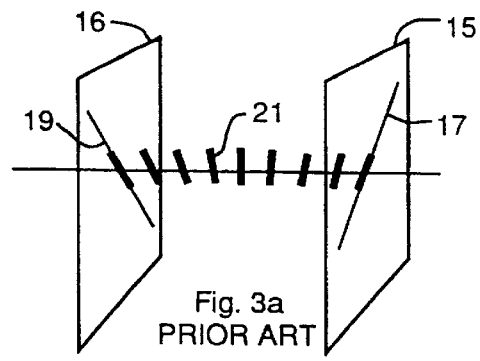
FIG. 3a and FIG. 3b show the molecule distribution in a twisted nematic liquid crystal display (prior art)
Figure 3B:
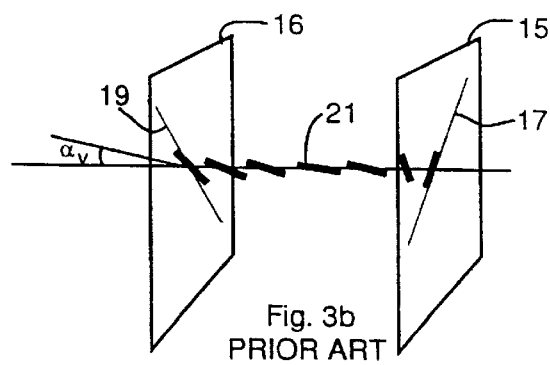
Figure 4:
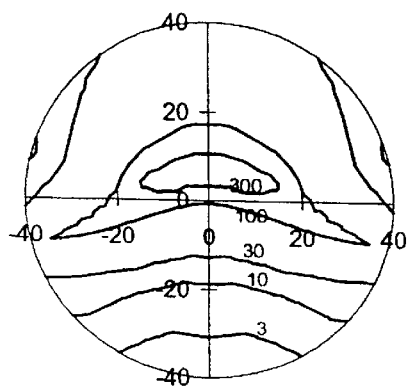
FIG. 4 shows simulated viewing angle characteristics with iso-contrast curves for incident angles of light on an LCD (prior art)

FIGS. 7a, 7b and 7c show that the ON-axis projector has a lower contrast at the bottom of the screen, because the lower intensity values are higher there than at the top of the screen. The bottom of the screen corresponds to the top of the LCD where incident light rays have a negative incident angle. The viewing angle characteristics of FIG. 4, which show lower contrast for negative incident angles of light, explain that the contrast is lower and thus most critical at the bottom of the image in the ON-axis projection system. With comparison to graph "0", graph "A", corresponding to an inclination of the analyser only, and graph "B", corresponding to an inclination of both the analyser and the polariser, show an improvement of the contrast at the top, in the middle and at the bottom of the screen.

Figure 9:
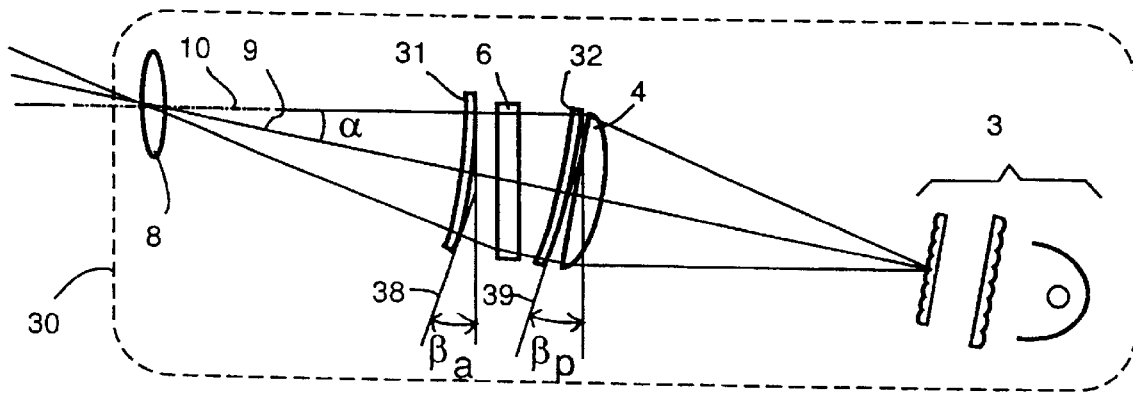
FIG. 9 shows an OFF-axis projector wherein the analyser and the polariser have a curved surface.
Figure 11:
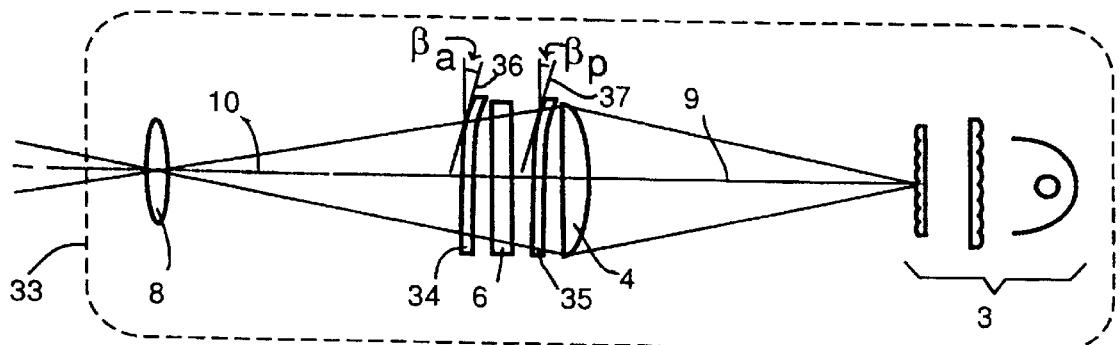
FIG. 11 shows an ON-axis projector wherein the analyser and the polariser have a curved surface.

Other embodiments of the present invention are shown in FIG. 9 and FIG. 11. In these embodiments, the surfaces of the analyser and polariser are not flat but curved.

Compared to the flat versions, the curved versions of analyser and polariser introduce a gradually enlarging angle to the LCD plane, the angle being largest at the contrast limiting area side of the LCD.

The advantage of these embodiments with curved surfaces for analyser and polariser is that space taken inside the projector by the disposition of the analyser and the LCD and by the disposition of the polariser and the field lens, is smaller when the surfaces of polariser and analyser are curved than when they are flat.

The curvatures of the surfaces of analyser and polariser do not decrease the contrast uniformity of the projection system, as long as the angle between the analyser or polariser on the one hand, and the plane of the LCD on the other hand, has its largest value facing the contrast limiting area side of the LCD, and is in the other areas large enough to permit the compensation of the contrast by adaptation of the drive voltage there. This is explained by the following.

Figure 5:
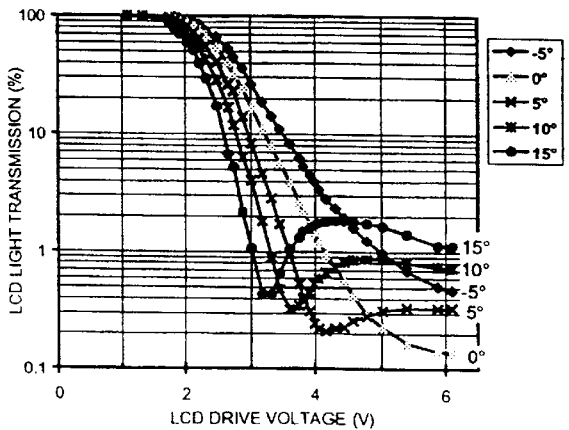
FIG. 5 shows the light transmission in function of the drive voltage and for different angles of light incidence (prior art)

For an LCD projection system aligned for uniform contrast, the overall contrast is limited to the contrast which can be obtained in the area where the contrast has a minimum in function of the drive voltage as made clear in FIG. 5. The contrast improvement obtained by an embodiment of the present invention must be maximum at that contrast limiting area and can be smaller in other areas as there it can be compensated by adaptation of the drive voltage. Therefor, a smaller improvement of contrast and so an angle smaller than the angle as stated by the present invention is permitted in other areas than the contrast limiting areas.

FIG. 9 shows a schematic view of an OFF-axis projector 30, whereby the analyser 31 and polariser 32 have a curved surface. The largest curvature corresponds to the bottom side of the LCD 6, which is the LCD side with the contrast limiting area. The angle $\beta_a$ is the angle between the LCD plane and the tangent plane 38 to the curved analyser 31 at a point of incidence of a light ray. $\beta_a$ is larger than $\alpha$ for light rays passing through the contrast limiting area of the LCD 6. The angle $\beta_p$ is the angle between the LCD plane and the tangent plane 39 to the curved analyser 32 at a point of incidence of a light ray. $\beta_p$ is larger than $\alpha$ for light rays passing through the contrast limiting area of the LCD 6.

FIG. 11 shows a schematic view of an ON-axis projector, whereby the analyser 34 and polariser 35 have a curved surface. The largest curvature corresponds to the topside of the LCD 6, which is the LCD side with the contrast limiting area. The angle $\beta_a$ is the angle between the LCD plane and the tangent plane 36 to the curved analyser 34 at a point of incidence of a light ray. $\beta_a$ is larger than zero for light rays passing through the contrast limiting area of the LCD. The angle $\beta_p$ is the angle between the LCD plane and the tangent plane 37 to the curved analyser 35 at a point of incidence of a light ray. $\beta_p$ is larger than zero for light rays passing through the contrast limiting area of the LCD 6.

The embodiments of the present invention as shown by FIGS. 8a, 8b and 9 describe OFF-axis projectors whereby the projection lens is positioned at a height lower than the middle of the screen. This applies to what is usually called a table-mounted projector. The present invention also applies to OFF-axis projectors whereby the position of the projection lens is higher than the height of screen. This applies to what is usually called a ceiling mounted projector. For a ceiling mounted projector, the figures FIGS. 8a, 8b and 9 do apply but should be mirrored vertically, and what is stated about the top of the screen then counts for the bottom of the screen, and vice versa.

What is claimed is:

1. A light valve image projector comprising:
   at least one illumination system;
   at least one field lens;
   at least one projection module including
      a polarizer;
      an LCD; and
      an analyzer; and
   at least one projection lens,
   said projector having an optical axis forming a first angle with an optical axis of the projection lens,
   wherein the analyzer in said at least one projection module forms a second angle larger than the first angle with the LCD in said at least one projection module, said second angle being such that the analyzer is not parallel to the polarizer in said projection module.

2. A projector according to claim 1 in which said polarizer forms a third angle larger than the first angle with the LCD in said projection module.

3. A projector according to claims 1 or 2 in which the first angle is different from zero.

4. A projector according to claims 1 or 2 in which the first angle is equal to zero.

5. A projector according to claims 1 or 2 in which said analyzer has a flat surface.

6. A projector according to claims 1 or 2, wherein the analyzer is curved and the second angle is defined by a plane parallel with the LCD and a plane tangent to the analyzer at a peripheral portion of the analyzer.

7. A projector according to claims 1 or 2 in which the polarizer has a flat surface.

8. A projector according to claims 1 or 2, wherein the polarizer is curved and the third angle is defined by a plane parallel with the LCD and a plane tangent to the polarizer at a peripheral portion of the polarizer.

9. A projector according to claims 1 or 2 comprising exactly one illumination system, three field lenses, three projection modules.

* * * * *